United States Patent [19]

Hense et al.

[11] Patent Number: 4,549,359
[45] Date of Patent: Oct. 29, 1985

[54] DATUM POINT LOCATION METHOD AND APPARATUS

[75] Inventors: Thomas R. Hense, New Berlin; Ronald M. Rudolph, Oak Creek, both of Wis.

[73] Assignee: Applied Power, Inc., Brookfield, Wis.

[21] Appl. No.: 552,769

[22] Filed: Nov. 17, 1983

[51] Int. Cl.$^4$ .......................... G01B 5/03; G01B 5/14
[52] U.S. Cl. ...................................... 33/516; 33/1 M; 33/180 AT; 33/520
[58] Field of Search .................. 33/1 CC, 1 M, 174 R, 33/174 J, 180 AT, 181 AT, 189

[56] References Cited

U.S. PATENT DOCUMENTS

| | | | |
|---|---|---|---|
| 4,165,567 | 8/1979 | Olsson | 33/288 |
| 4,174,623 | 11/1979 | LeGrand et al. | 33/180 AT X |
| 4,207,681 | 6/1980 | Bayorgeon et al. | 33/180 AT |
| 4,230,011 | 10/1980 | Battaglia | 33/1 M |
| 4,329,784 | 5/1982 | Bjork | 33/180 AT |
| 4,464,839 | 8/1984 | Sadeh | 33/1 M |
| 4,479,305 | 10/1984 | Wendl et al. | 33/180 AT |

FOREIGN PATENT DOCUMENTS 915666  5/1952  Fed. Rep. of Germany ..... 33/174 J

OTHER PUBLICATIONS

Blackhawk Diagnostic Measuring Accessory Operating Instructions 1982, 18 pages.

*Primary Examiner*—Richard R. Stearns
*Attorney, Agent, or Firm*—Fred Wiviott

[57] ABSTRACT

A support base has an attachment device for being secured in a predetermined position on a frame. A first coupler is mounted on the support base for movement in two mutually perpendicular directions and a first elongate member, is mounted in the first coupler and extends in a direction normal to the plane defined by the directions in which the the first coupler is movable. A universal coupling is disposed at the remote end of the first member and includes a second coupling and a clamp for securing the second coupling in any angular orientation relative to the remote end of the first member. A second elongate member is longitudinally adjustable and is fixed to the second coupling so that the remote end of the second member may be three-dimensionally adjusted relative to the remote end of the first member. A datum point is located in space relative to a stationary base by fixing the remote end of the second elongate member to a fixed element defining the point, clamping the other end of the second member to the upper end of the first member by means of the universal coupling, two-dimensionally adjusting the lower end of the first member relative to reference points on the base, and clamping the lower end of the first member relative to the base.

10 Claims, 5 Drawing Figures

DATUM POINT LOCATION METHOD AND APPARATUS

BACKGROUND OF THE INVENTION

This invention relates to a method and apparatus for locating a point in space relative to a fixed datum base.

Before a damaged motor vehicle can be repaired, it is necessary to determine the extent to which the location of various datum points on the vehicle deviate from manufacturer's specifications. Repair is then achieved by reforming damaged portions of the vehicle until all datum points have been returned to correct relative positions. The proper repair of body damage is particularly important in vehicles of the so-called unibody construction since accurate body alignment is essential for correct vehicle suspension and steering.

Systems for measuring the damage or misalignment of vehicle bodies are commonly called measuring bridges. One such assembly includes a fixed frame having a plurality of support fixtures for engaging key datum points on the vehicle whereby the latter is supported relative to a fixed datum plane. With the vehicle supported in this manner, fixtures are employed for determining whether reference points on the vehicle are located in correct three dimensional positions relative to this datum plane. These points include, for example, the shock towers in the rear of the vehicle and the McPherson strut mountings in the front. The locations of these points differ in vehicles of different manufacturers and between different vehicle models of the same manufacturer. As a result, prior art measuring bridges require a different set of measuring fixtures for substantially each automobile model and body style. This substantially increases the cost of such systems, particularly as a result of a proliferation of new models which require the continued acquisition of additional fixtures.

SUMMARY OF THE INVENTION

It is an object of the invention to provide a new and improved method of manufacturing fixtures for locating automobile datum points.

Another object of the invention is to provide an adjustable fixture for locating automobile datum points which may be used with a variety of automobile models.

These and other objects and advantages of the present invention will become more apparent from the detailed description thereof taken with the accompanying drawings.

In general terms, one aspect of the invention comprises apparatus for locating a datum point in space relative to a support frame and includes a support base adapted to be secured in various discrete positions on the support frame, first coupling means adjustably mounted on the base for movement in two mutually perpendicular directions, and means for locking the first coupling means in the discrete positions. First elongate means is secured to the coupling means and extends in a direction perpendicular to the plane defined by the first and second directions. Universal coupling means is mounted at the remote end of the first means and includes a second coupling means and means for securing the second coupling means in any vertical and horizontal angular orientation relative to the remote end of the first elongate means and a second elongate means is fixed at one end to the second coupling means and is adjustable longitudinally so that the remote end of the second elongate means may be positioned at a predetermined point in space relative to a point on the base.

A second aspect of the invention comprises a method of locating a point in space relative to a fixed base point and comprising the steps of vertically and horizontally adjusting the angle of a first elongate member relative to a second, generally vertically extending elongate member, fixing the remote end of the first elongate member to a fixed element defining the point in space, and adjusting the length of the first elongate member to bridge the gap between the fixed element and the upper end of the second elongate generally vertically oriented member. In addition, the angular orientation of the first and second members are fixed and the lower end of the second vertical member is two dimensionally adjusted and then clamped relative to a fixed support base.

DETAILED DESCRIPTION OF THE PREFERRED EMBODIMENT

Figure 1:
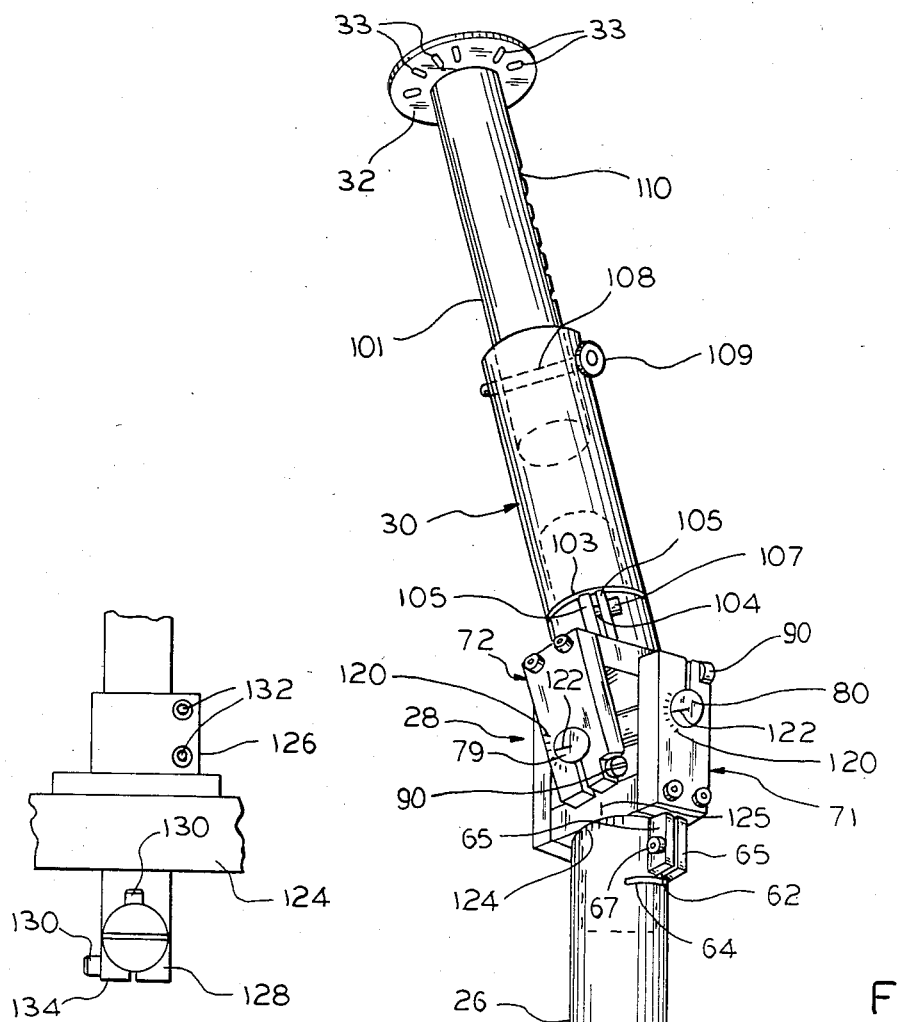
FIG. 1 is a perspective view of the universal fixture in accordance with the present invention.

FIG. 1 shows an adjustable fixture 10 in accordance with the preferred embodiment of the invention and which may be employed for locating a datum point on a motor vehicle relative to a reference point on a measuring bridge. The fixture 10 may also be used for the manufacture of permanent fixtures to be used for locating the same datum point on like vehicles.

Those skilled in the art will appreciate that the adjustable fixture 10 illustrated in FIG. 1 will be employed with a measuring bridge such as that shown in application Ser. No. 357,581 filed Mar. 12, 1982 now U.S. Pat. No. 4,479,305. The details of such a measuring bridge are known and accordingly will not be discussed in detail for the sake of brevity. For understanding the invention, it will be sufficient to state that the bridge includes a main frame 12 upon which the vehicle to be repaired is supported. A plurality of locating holes 14 are formed in the frame 12 and are arranged in a predetermined array to provide mounting points of known coordinates for various measuring devices and locating fixtures such as that shown in FIG. 1. Toward this end, the fixture 10 includes a base 16 having a plurality of openings 18 formed therein and spaced from each other distances which correspond to the spacing of openings 14 in frame 12. This permits the fixture 12 to be located at predetermined horizontal coordinates relative to the vehicle.

In general terms, the fixture 10 also includes a body 20 which may be three dimensionally adjusted relative to the base 16 by slide assemblies 22 and 24. A first elongate member 26 extends upwardly from the body 20 and is engaged by a universal clamp 28 at its upper end. A second longitudinally adjustable elongate assembly 30 extends from the opposite end of the universal clamp 28 and carries a datum locating pad 32 or other suitable structure at its free end. The pad 32 preferrably has locating slots 33 which permits connection to a two, three, or four bolt pattern on the vehicle.

The body 20 is generally rectangular in plan view and has a rod 34 extending upwardly from its upper surface. Also affixed to the upper surface of the body 20 and spaced on the opposite sides of the rod 34 are a pair of slides 36 of slide assembly 24. Each slide 36 has a central bore 38 and a slit 40 in one of its edges, although the slit is shown in the upper edge for purposes of illustration. The bores 38 slidably engage slide rods 41 supported in a parallel, spaced apart relation on end supports 42 which are in turn mounted atop slide members 44 forming a part of the slide assembly 22. A pair of clamp screws 46 extend through threaded openings in slides 36 and aligned on the opposite sides of the slit 40 so that the slides 36 may be clamped in a fixed horizontal position relative to the slide rods 41. The slide assembly 22 also includes a pair of parallel, spaced apart side rods 46 the ends of which are supported on base 16 by means of vertical posts 48 extending upwardly from each corner. The slide rods 46 are parallel to each other and extend in a direction which is normal to the direction in which the slide rods 41 extend. Each of the slide rods 41 and 46 are respectively retained in their end supports in any suitable manner such as by means of set screws 50. The slides 44 each have a central bore 52 which is slidably received on one of the slide rods 46. A longitudinal slit 54 is also formed through the lower end of each slide 44 and each is intersected by a pair of clamp nuts 56 so that each slide 44 may be clamped in a fixed horizontal position relative to the base 16.

The elongate member 26 comprises a hollow tube having longitudinal and transverse slits 62 and 64 formed adjacent each end and intersecting to form a T. Flanges 65 are fixed to member 26 and on each of the opposite sides of each slit 62. Clamp screws 67 extend through each pair of flanges 65 for clamping the tube 26 to the rod 34 and to the universal clamp assembly 28.

Figure 3:
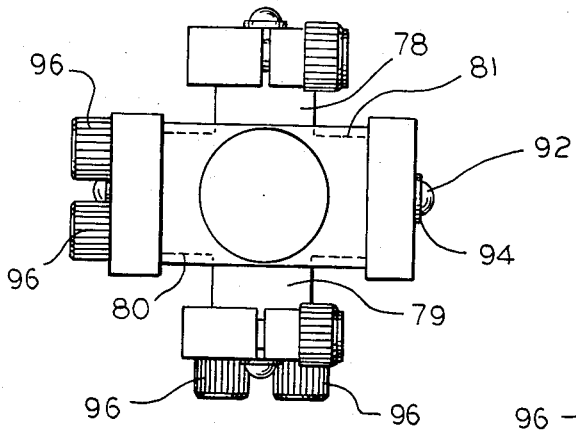
FIG. 3 is a top view of the fixture portion shown in FIG. 2.
Figure 2:
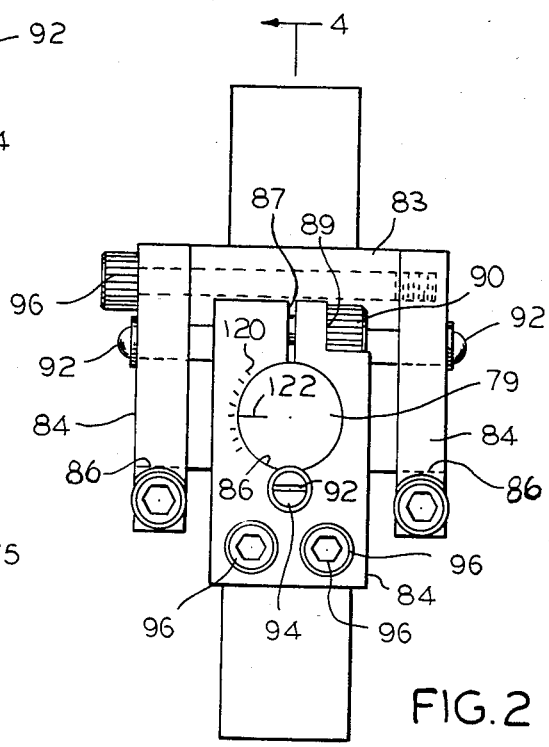
FIG. 2 is a side elevational view of a portion of the fixture show in FIG. 1.
Figure 4:
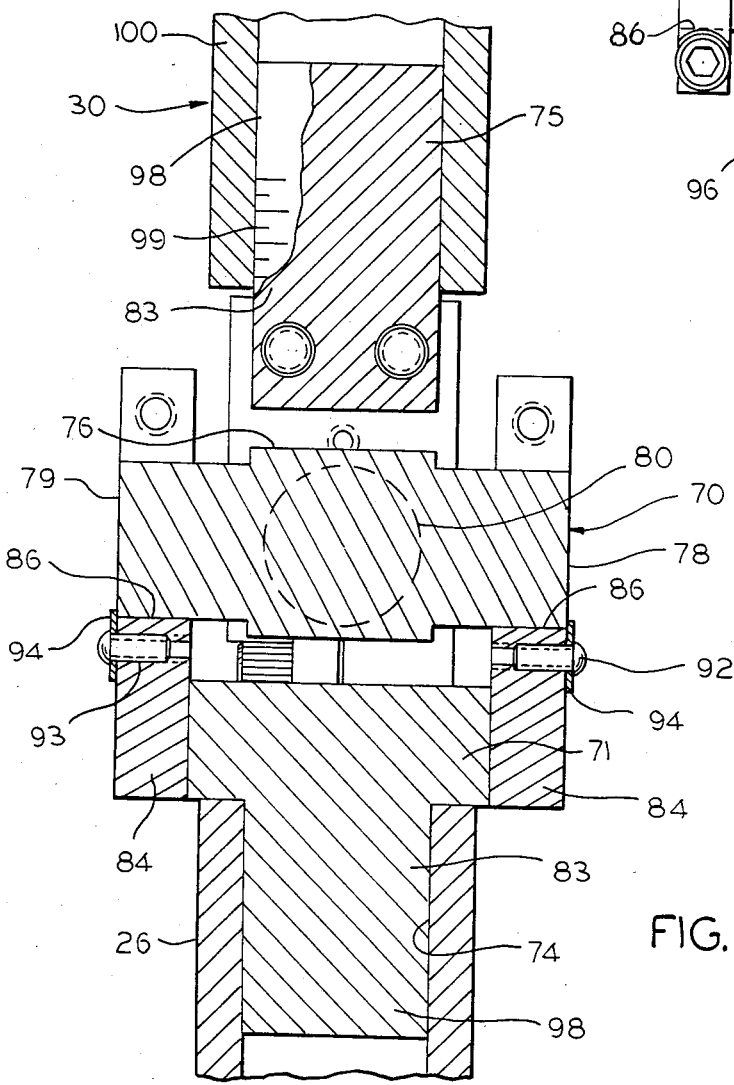
FIG. 4 is a view taken along lines 4—4 of FIG. 2.

The universal clamp assembly 28 is shown in FIGS. 2, 3 and 4 to include a trunion member 70 and a pair of yokes 71 and 72 which are mounted on trunion member 70 for pivotal movement about mutually perpendicular axes. Pins 74 and 75 extend from each yoke 71 and 72 respectively, for being coupled to the elongate members 26 and 30. The trunion member 70 includes a generally rectangular center body portion 76 and pairs of trunion pins 78 and 79 extending coaxially on opposite directions from one pair of opposed sides of body portion 76 and a second pair of trunion pins 80 and 81 extending from a second pair of opposed sides and along an axis perpendicular to that of pins 78 and 79.

Each yoke 71 and 72 includes a block 83 and a pair of side plates 84 affixed to the block 83 by screws 96 and extending in a parallel, spaced apart relation from the opposite ends thereof. Each sideplate 84 has a central aperture 86 complementary to and slidably engaging one of the trunion pins 78, 79, 80 or 81. The free end of each slideplate 84 has a slit 87 extending from its outer end and intersecting the aperture 86. In addition, a recess 89 is formed in the end and along one side of each plate 89 for receiving the head of a lock screw 90 which is threadably received through aligned opening in the plate 84 and extending perpendicularly to and facing the slit 87. In this manner, each of the yokes 71 and 72 can be clamped in any angular position with respect to the trunion pins which its respective sideplates 84 engage. Sideways motion of the yokes 71 and 72 on the trunion pins 78, 79, 80 and 81 is prevented by means of screws 92 which are threaded into openings 93 in each sideplate 84 and adjacent to in general parallelism with the respective trunion pin 78, 79, 80 and 81. Each screw 92 secures a washer 94 which overlaps the edges of one trunion pin 78, 79, 80 or 81. Extending from each block 83 of yokes 71 and 72 are pins 98 which are respectively engaged by the elongate members 26 and 30. The pin 98 has a scale 99 provided thereon as shown in FIG. 4.

The upper elongate assembly 30 includes a first tubular member 100 and a second, smaller diameter tubular member 101 which is telescopingly received within the open upper end of the first tubular member 100. Formed adjacent the lower end of the first tubular member 100 are a pair of mutually perpendicular slits 103 and 104. In addition, a pair of flanges 105 are affixed to member 100 and on the opposite sides of the slit 104. Clamp screws 107 extends through aligned threaded openings in flanges 105 to permit the lower end of tubular member 100 to be clamped to the pin 98 of yoke 72. A pin 108 having a head 109 at one end extends through aligned openings 110 formed in the upper end of the first tubular member 100. The second tubular member 101 similarly has a series of spaced apart openings 112 on each side and complementary to the openings in the first tubular member 100 whereby the openings 112 may be aligned with the openings 110 for receiving the pin 108 therethrough. In this manner, the second tubular member 101 may be locked in each of a plurality of longitudinal positions relative to the first tubular member 100. For adjustments between openings 110, the lower end of the tubular member 100 relative to the scale 99 on pin 98.

The fixture 10 shown in FIG. 1 may be used either as a universal fixture for determining the proper position of a strut tower or shock absorber well or as a pattern for manufacturing such fixtures for a specific vehicle.

When the assembly 10 is used as a universal fixture, the operator will determine from vehicle specifications the various horizontal, vertical, and angular relationships of datum points. When used for this purpose, the fixture will include a first scale 112 located below one edge of the block 20 and oriented parallel to the slide rods 41. In addition, a second scale 114 is mounted below one edge of one of the slides 44 and is oriented parallel to slide rods 46. Indicators 116 and 118 may be mounted respectively on block 20 and slide 44 for cooperation with scales 112 and 114. The scales 112 and 114 are employed for positioning the block 20 on the slide rods 41 and the slides 44 on the slide rods 46 in accordance with the vehicle specification sheet. In addition, an angular scale 120 is provided on one sideplate 84 of each yoke 71 and 72 and adjacent to the openings 86 formed therein. An indicator 122 is provided on each trunion pin 79 and 80 for cooperation with the scales 120. A third angular scale 124 is provided at the upper end of tubular member 26 for cooperation with the indicator 124 on yoke 71.

From the vehicle specification sheet, the coordinates of the block 20 and the slides 44 relative to the base 16 are determined and these members positioned accordingly on slide rods 41 and 46, respectively. The clamp screws 46 and 56 are then tightened to fix the first elongate member 26 in a predetermined, horizontal position relative to the base 16. The yokes 71 and 72 are then oriented in angular positions determined from the specification sheets and the clamp screws 67 and 86 tightened to clamp the universal clamp 28 in the correct horizontal angle and each yoke 71 and 72 in the correct vertical angular relationship with respect to the elongate member 26. Finally, the length of the second elongate assembly 30 is adjusted in accordance with the specifications and the pin 108 inserted to fix the pad 32 in the correct point in space relative to the base 16. If finer adjustments are required than is available with the pin 108 and openings 110, the second tubular member 101 may alternately be threaded into the open end of tube 100. In that case, a scale would also be provided along the side of the member 101.

When the fixture of FIG. 1 is to be employed for the manufacture of fixtures for specific vehicle models, the reverse procedure is employed. More particularly, the vehicle is mounted in the frame 12 and locked in position. The base 16 is also mounted on the frame 12 and locked in the correct position by inserting bolts through openings 18 and the appropriate aligned openings 14 in frame 12. The locking screws 46, 56, 67 and 80 are all loosened. The pad 32 is then placed in contact with a datum point on the vehicle, such as the strut tower, while the slides 36 and 44 are manipulated on slide rods 41 and 46, and the vertical and horizontal angles of yokes 71 and 72 adjusted. When the pad 32 is in position, the pin 108 is inserted to establish the length of the first elongate section 30. The clamping screws 67 and 86 are then tightened to fix the angular position of the elongate section 30 relative to the elongate section 26. Finally, the clamping screws 46 and 56 are tightened to fix the horizontal position of the elongate section 26.

Figure 5:
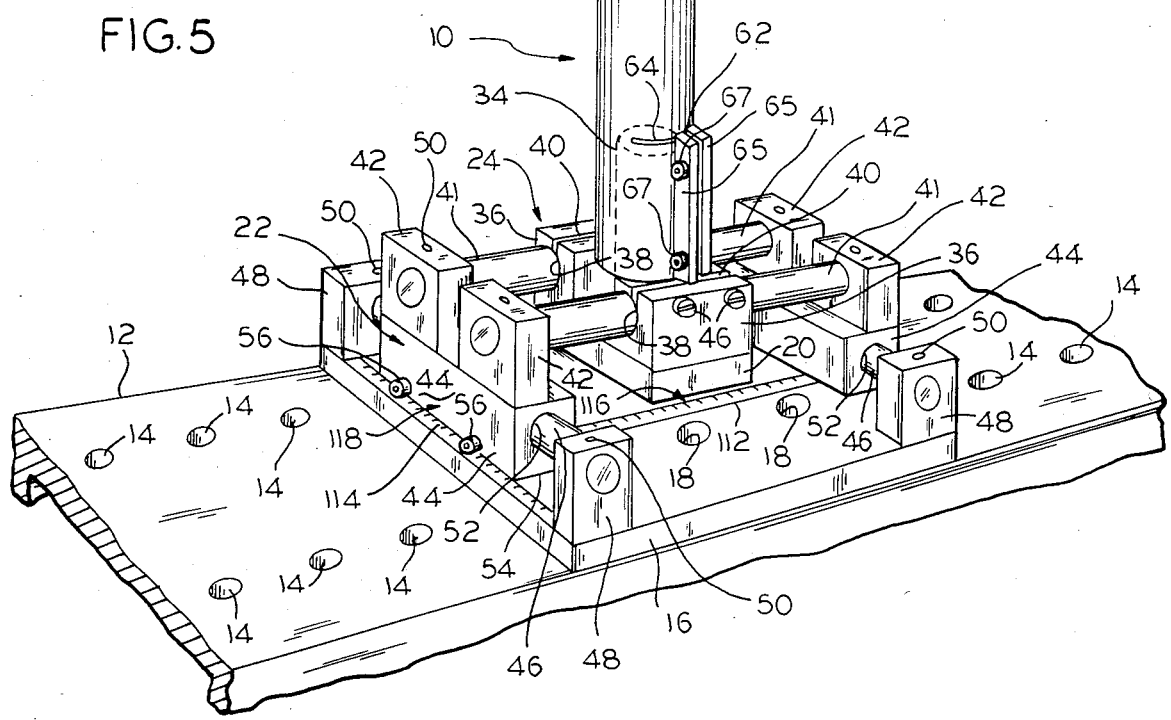
FIG. 5 shows a portion of a welding fixture with which the fixture of FIGURE may be used when employed for the manufacture of permanent fixtures for a specific vehicle.

After the assembly has been tightened with all the members in the correct relative angular and longitudinal positions for the particular vehicle model, the fixture is removed from the frame 12 and positioned adjacent a welding fixture such as that shown in FIG. 5. While the welding fixture forms no part of the present invention, it will be described briefly for purposes of explanation. Particularly, the welding fixture includes a frame 124 upon which a block 126 is movable longitudinally. In addition, a pad 128 mounted on block 126 is rotatable about vertical and horizontal axes and may be locked in position by clamp screws 130. The pad 128 is also vertically movable relative to block 126, and its vertical position fixed by clamp screws 132. After the fixture of FIG. 1 has been adjusted as indicated above, it is positioned at a fixed position relative to frame 124 of the welding fixture and the pad 128 is adjusted vertically, horizontally, and angularly so that the lower surface 134 of pad 128 forms a mirror image in space of the complimentary surface of the pad 32. The fixture 10 may then be removed and the welding fixture employed for reproducing fixtures which duplicate the relative longitudinal height and angular dimensions of the fixture FIG. 1.

While only a single embodiment of the invention has been illustrated and described, it is not intended to be limited thereby, but only by the scope of the appended claims.

We claim:

1. Apparatus for locating and securing a datum point in space relative to a support frame, the combination including:
   a support base having coupling means for securing the support base in various discrete positions on said support frame,
   first coupling means adjustably mounted on said base for movement in two mutually perpendicular directions,
   means for locking said first coupling means in discrete positions on said support base,
   first elongate means secured to said coupling means and extending in a direction perpendicular to the plane defined by said first and second directions,
   universal coupling means mounted at the remote end of said first elongate means and including a second coupling means and means for securing the second coupling means in any vertical and horizontal angular orientation relative to the remote end of the first elongate means,
   a second elongate means fixed at one end to said second coupling means and being extendably adjustable longitudinally whereby the remote end of the second elongate means may be positioned at a predetermined point in space relative to a point on said base.

2. The apparatus set forth in claim 1 wherein said universal coupling means comprises a universal joint, said universal joint being mounted at the upper end of said first elongate means for rotation about the axis thereof.

3. The apparatus set forth in claim 2 wherein said universal joint includes first and second pins extending in mutually perpendicular directions, a first yoke means coupled to one of said pins and mounted on the upper end of said first elongate means and second yoke means engaging the second pair of pins and being mounted at the lower end of said second elongate means.

4. The apparatus set forth in claim 1 wherein said base includes first and second slide means, said first slide means being mounted on said base for movement in a first direction and said second slide means being mounted on said first slide means for movement in a second direction perpendicular to said first direction, said first coupling means being mounted on said second slide means for movement therewith.

5. The apparatus set forth in claim 4 wherein said universal coupling means comprises a universal joint, said universal joint being mounted at the upper end of said first elongate means for rotation about the axis thereof.

6. The apparatus set forth in claim 5 wherein said universal joint includes first and second pins extending in mutually perpendicular directions, a first yoke means coupled to one of said pins and mounted on the upper end of said first elongate means and second yoke means engaging the second pair of pins and being mounted at the lower end of said second elongate means.

7. A method of locating a point in space relative to a fixed base point, comprising the steps of:
   vertically and horizontally adjusting the angle of a first elongate member relative to a second generally vertically extending elongate member,
   fixing the remote end of said first elongate member to a fixed element defining the point in space,
   adjusting the length of said first elongate member to bridge the gap between the fixed base point and the upper end of said second elongate member whereby said members have an angular orientation,
   securing the first and second members to prevent movement out of said angular orientation and two dimensionally adjusting the lower end of said second vertical member in a generally horizontal plane, and clamping the lower end of the second vertical member relative to a fixed support base after the two dimensional horizontal adjustment thereof.

8. The method set forth in claim 7 wherein the fixed point in space comprises a vehicle datum point, and including the steps of locating said vehicle on a frame, positioning said support base at a predetermined location on said frame, positioning the remote end of the first elongate member adjacent said datum point prior to securing said elongate members in said angular orientation whereby the position of said datum point in space will be located relative to a fixed point on said support frame.

9. The method set forth in claim 8 including steps of positioning said base in a predetermined location relative to a welding jig, and locking an element of said jig in engagement with the remote end of said first member to provide on said welding jig a mirror image of the point in space defined by the remote end of said first member whereby said first and second members and the angular orientation thereof can be duplicated.

10. The method set forth in claim 7 including steps of positioning said base in a predetermined location relative to a welding jig, and locking an element of said jig in engagement with the remote end of said first member to provide on said welding jig a mirror image of the point in space defined by the remote end of said first member whereby said fixture can be duplicated.

* * * * *